US008545746B2

(12) United States Patent
Kustandi et al.

(10) Patent No.: US 8,545,746 B2
(45) Date of Patent: Oct. 1, 2013

(54) METHOD OF MAKING A SUBSTRATE HAVING MULTI-LAYERED STRUCTURES

(75) Inventors: Tanu Suryadi Kustandi, Singapore (SG); Hong Yee Low, Singapore (SG); Isabel Rodriguez Fernandez, Singapore (SG)

(73) Assignee: Agency for Science, Technology and Research (SG)

( * ) Notice: Subject to any disclaimer, the term of this patent is extended or adjusted under 35 U.S.C. 154(b) by 143 days.

(21) Appl. No.: 12/997,272

(22) PCT Filed: Jun. 10, 2009

(86) PCT No.: PCT/SG2009/000208
§ 371 (c)(1),
(2), (4) Date: Jun. 3, 2011

(87) PCT Pub. No.: WO2009/151405
PCT Pub. Date: Dec. 17, 2009

(65) Prior Publication Data

US 2011/0250407 A1 Oct. 13, 2011

Related U.S. Application Data

(60) Provisional application No. 61/060,341, filed on Jun. 10, 2008.

(51) Int. Cl.
*B29C 59/00* (2006.01)
*B29C 39/00* (2006.01)
*B29C 41/00* (2006.01)
*B44C 1/00* (2006.01)

(52) U.S. Cl.
USPC ... 264/293; 264/165; 264/172.19; 264/173.1; 264/299; 428/195.1

(58) Field of Classification Search
None
See application file for complete search history.

(56) References Cited

U.S. PATENT DOCUMENTS 6,054,091 A * 4/2000 Miller et al. .................. 264/442
2005/0064720 A1 * 3/2005 Sharma ......................... 438/734

OTHER PUBLICATIONS

Written Opinion of PCT/SG09/00208, Aug. 24, 2009.*

* cited by examiner

*Primary Examiner* — Benjamin Schiffman
(74) *Attorney, Agent, or Firm* — Osha Liang LLP

(57) ABSTRACT

A method of making a substrate having multi-layered structures thereon, the method comprising the steps of (a) applying a mold having an imprint forming surface to the substrate to form an array of imprint structures that projects from the substrate; and (b) applying a lateral force that is substantially normal to said projecting imprint structures to cause said imprint structures to move angularly towards said substrate and thereby form a pattern of multi-layered structures thereon.

17 Claims, 5 Drawing Sheets

10 14 16 (a) 18 10 12 16 (b) 20 (c) 12 10 50′ θ 54 52 100 (e) 54 22 10 12 50′ 16 14 50 (d)

10
14
16
(a)
18
10
12
16
(b)
20
(c)
22
10
12
16
14
50
54
50'
(d)
50'
θ
12
10
52
54
(e)
100

METHOD OF MAKING A SUBSTRATE HAVING MULTI-LAYERED STRUCTURES

TECHNICAL FIELD

The present invention generally relates to a method of making a substrate having multi-layered structures thereon. The present invention also relates to a substrate having multi-layered structures thereon and uses thereof.

BACKGROUND

Over the years, many researchers have investigated the mechanism of the optical effects of incident light reflected from butterfly insect wings. However, only in recent years have significant advances been made to understand the mechanism behind this effect. The mechanism for creating the bright iridescence in butterfly wings has now been found to be the combined effects of diffraction and interference of light from elaborate arrays of multilayered sub-micrometer structures. These multilayered structures are present in an overlapping pattern, and form a domino-like photonic nanostructure.

As the development of a new type of photonic element by mimicking the butterfly's wings is very alluring, there have been attempts to imitate and reproduce the multilayered structures. One technique that has been utilised in an attempt to create a structure that mimics the optical effects of butterfly insect wings is the use of focused ion beam induced chemical vapour deposition (FIB-CVD) to manufacture such microstructures. However, FIB-CVD has a number of disadvantages. One disadvantage is that the use of FIB-CVD lacks potential scalability and cost effectiveness. As such, commercial-scale manufacture using FIB-CVD is not economically viable.

Another method is the generation of nanometer-scale stepped patterns consisting of alternately $TiO_2$ and $SiO_2$ thin films, by the combination of lithography and electron beam deposition. However, the disadvantage of this method is that it requires multiple deposition steps of materials with different refractive indexes to obtain a multi-layered stacked structure. As such, the method is both complicated and time-consuming.

Despite the methods described above to emulate and replicate the multilayered structures on the butterfly wings, the development of cost-effect methods that can closely imitate the structural complexity of the butterfly wings still represents one of the technical challenges facing fabrication of such structures.

There is a need to provide a method of making a substrate having multi-layered structures that overcomes or at least ameliorates one or more of the disadvantages described above.

SUMMARY

According to a first aspect, there is provided a method of making a substrate having multi-layered structures thereon, the method comprising the steps of:

a) applying a mold having an imprint forming surface to the substrate to form an array of imprint structures that projects from said substrate; and b) applying a lateral force that is substantially normal to said projecting imprint structures to cause said imprint structures to move angularly towards said substrate and thereby form a pattern of multi-layered structures thereon Optionally, the applying step (b) may be undertaken during mold release and while the imprint structures are partially within said mold. In another embodiment, the applying step (b) may be undertaken before mold release.

Advantageously in one embodiment, each of said imprint structures is moved in step (b) such that the array of imprint structures is configured to reflect incident light thereon. The imprint structures have a longitudinal axis and during said applying step (b), may be moved such that their longitudinal axis is disposed at an oblique angle relative to a horizontal plane of said substrate.

Advantageously, the method may optionally exclude any chemical treatment or chemical deposition to form the multi-layered structures on the substrate surface. The method advantageously may be a physical modification of the optical properties of the substrate.

Advantageously, the method may alter the optical properties of the substrate having multi-layered structures thereon. The method may not affect the thermal or chemical properties of the substrate. According to a second aspect, there is provided a patterned substrate comprising an array of imprint structures disposed on the substrate, each of said imprint structures having a longitudinal axis and wherein each imprint is disposed at an oblique angle relative to a horizontal plane of said substrate, wherein the array of imprint structures is configured to reflect light incident thereon.

Advantageously, the oblique angle is selected such that imprint structures, that are adjacent to each other, partially overlap when viewed from a horizontal plane above the imprint structures.

Advantageously, the array of imprint structures on the substrate may be able to manipulate light that is incident on the substrate through optical interference or diffraction and thereby reflect light having different wavelengths from the substrate. The different wavelengths present in the reflected light result in variation in the type of colours and colour intensities in the reflected light. Accordingly, the array of imprint structures on the substrate may result in tunable colour and colour pattern variations.

According to a third aspect, there is provided the use of a substrate as defined above, or a substrate made in a method as defined above, to reflect light in an optical detection system.

Advantageously, the optical detection system may be used to detect the presence of a target chemical in a test sample. The substrate having multi-layered structures thereon may be capable of detecting vapours in the test sample by comparing the optical response of light reflected from the multi-layered structures when an incident light is shone thereon of the test sample with that of a control sample. Any variations in the optical response between the two samples may be indicative of the presence of a vapour in the test sample. The optical response of the test sample or the variation from the optical response of the control sample can be compared to a reference optical response in order to identify the type of vapour present in the test sample.

According to a fourth aspect, there is provided a substrate having multi-layered structures thereon, the substrate being made in a method comprising the steps of:

a) applying a mold having an imprint forming surface to the substrate to form an array of imprint structures that project from said substrate;

b) applying a lateral force that is substantially normal to said projecting imprint structures to cause said imprint structures to move angularly towards said substrate and thereby form a pattern of multi-layered structures thereon.

DEFINITIONS

The following words and terms used herein shall have the meaning indicated:

The terms "collapse", "collapsing" and grammatical variations thereof, with respect to imprint structures and in the context of this specification, refers to projecting imprint structures having a longitudinal axis which are angularly moved towards a horizontal plane of the substrate. Typically, after collapse of the imprint structures, imprint structures that are adjacent to each other partially overlap when viewed from a horizontal plane above the imprint structures. Collapse does not necessarily mean that the imprint structures are no longer free-standing or that their longitudinal axis is parallel with the horizontal plane of the substrate, as the imprint structures may be at an oblique angle relative to the horizontal plane of the substrate.

The term "multi-layered" is to be interpreted broadly, when used in conjunction with the imprint structures on a substrate, to refer to two or more layers of structures that partially overlap, one on top of the other, when viewed from a horizontal plane above the imprint structures. In the multi-layered configuration, the imprint structures are disposed at an oblique angle relative to a horizontal plane of the substrate.

The term "lateral force" is to be interpreted broadly to include any force that has a direction substantially normal to a longitudinal axis of the imprint structures that protrude from the substrate surface.

The term "nanoimprinting lithography" is to be interpreted broadly to include any method for printing or creating a pattern or structure on the micro/nanoscale on the surface of a substrate by applying a mold with a defined imprint pattern or structure on the surface at certain temperature and pressure. A method of nanoimprinting lithography can be referred from U.S. Pat. No. 5,772,905.

The term "microscale" is to be interpreted to include any dimensions that are in the range of about 1 (μm) to about 100 μm. The term "microstructures" as used herein, refers to imprint structures comprising "microscale" features.

The term "nanoscale" is to be interpreted to include any dimensions that are below about 1 μm. The term "nanostructures" as used herein, are imprint structures comprising "nanoscale" or "submicron" features.

The term "three dimensional" is to be interpreted broadly to include any structures, structural features, imprint structures or patterns that have both lateral variations (thickness) as well as variations with depth.

The term "glass transition temperature" ($T_g$) is to be interpreted to include any temperature of a polymer at which the polymer lies between the rubbery and glass states. This means that above the $T_g$, the polymer becomes rubbery and can undergo elastic or plastic deformation without fracture. Above this temperature, such polymers can be induced to flow under pressure. When the temperature of the polymer falls below the $T_g$, generally, the polymer will become more inflexible but can be deformed when a stress is applied to the polymer. It should be noted that the $T_g$ is not a sharp transition temperature but a gradual transition and is subject to some variation depending on the experimental conditions (e.g., film thickness, tacticity of the polymer, etc.). The actual $T_g$ of a polymer film will vary as a function of film thickness. The $T_g$ will be defined herein as being the bulk glass-transition temperature of the polymer substrate. The bulk glass transition temperature is a specific value that is widely agreed upon in the literature. Glass transition temperature values of polymers may be obtained from *PPP Handbook*™ software edited by Dr D. T. Wu, 2000.

The term "thermoplastic" refers to a material that softens when sufficient heat and pressure is applied to the material and hardens as it cools down. When the term "thermoplastic" is used to refer to a polymer, the thermoplastic polymer softens at a temperature above the $T_g$ and hardens when the temperature is decreased until below the $T_g$. As the thermoplastic polymer cools from the $T_g$, the thermoplastic polymer becomes less moldable or deformable as compared to the state of the thermoplastic polymer in the first applying step (a) when the mold is applied to the polymer substrate.

The term "plasma treatment" is to be interpreted broadly to include any exposure of a surface to plasma such that organic contaminants on the surface are at least partially destroyed. Generally, such plasma is a low-pressure oxidative plasma such as oxygen ($O_2$), argon, and mixtures of oxygen and argon that is generated by a radio frequency (RF) or microwave source.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means+/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

DISCLOSURE OF OPTIONAL EMBODIMENTS

Exemplary, non-limiting embodiments of a method of making a substrate having multi-layered structures thereon will now be disclosed.

The method comprises the steps of:

a) applying a mold having an imprint forming surface to the substrate to form an array of imprint structures that project from said substrate; and b) applying a lateral force that is substantially normal to said projecting imprint structures to cause said imprint structures to move angularly towards said substrate and thereby form a pattern of multi-layered structures thereon.

In one embodiment, the applying step (b) may be undertaken during mold release and while the imprint structures are partially within said mold. In another embodiment, the applying step (b) may be undertaken before mold release.

The imprint structures may be generally longitudinal in shape, each of the imprint structures extending about a longitudinal axis.

The lateral force applied may be a shear force. The amount or magnitude of lateral force that can be applied is dependent on the material of the substrate used, the relative temperature at which the lateral force is being applied, the aspect ratio of the imprint structures, the density of the imprint structures and the total area of the substrate being patterned by the imprint structures. Typically, in an embodiment where polycarbonate is used as the substrate having a patterned area of 2 $mm^2$ and imprint structures that are 200 nm wide and 1.2 μm long, the amount or magnitude of lateral force that can be applied is in the range of about 10 to 20 N.

The applying step (b) may comprise the step of moving the imprint structures such that the longitudinal axis of the imprint structures is angularly moved towards the substrate from a substantially vertical axis relative to a horizontal plane of the substrate. That is, the imprint structures are caused to collapse.

The applying step (b) may comprise the step of moving the substrate in a direction opposite to the direction in which the imprint structures are caused to collapse.

As the imprint structures collapse, the imprint structures stack and overlap on top of each other when viewed from a horizontal plane above the imprint structures. In one embodiment, the overlapping imprint structures may be in physical contact with each other. Hence, the collapsing step may result in each of the imprint structures abutting, or be in closer proximity to, an adjacent imprint structure. In another embodiment, the overlapping imprint structures may not be in physical contact with each other. This occurs if the elastic modulus of the substrate is larger than its critical elastic modulus, as defined further below.

The longitudinal axis of the imprint structures may be at an oblique angle relative to the horizontal plane of the substrate during the collapsing step. This angle may be dependent on the elastic modulus of the type of substrate used. This angle can be selected from the group consisting of more than about 0° to about 60°, more than about 0° to about 20°, more than about 0° to about 40°, about 20° to about 60°, about 40° to about 60°, about 25° to about 35° and about 40° to about 50°. In one embodiment, the oblique angle is selected from the group consisting of about 10° to about 60°, about 10° to about 20° and about 10° to about 40°. In another embodiment, the angle between the imprint structure and the substrate surface is about 30°. In a further embodiment, the angle between the imprint structure and the substrate surface is about 45°.

In order for the imprint structures to overlap and form the multi-layered structures, the height of the imprint structures should be greater than the distance between two adjacent imprint structures arranged side-by-side. The height may be at least two times the spacing distance in order to ensure a single overlap. Multiple overlaps may also occur if the height of the imprint structures is substantially greater than two times the spacing distance between two adjacent imprint structures. By "multiple overlap", it is meant that when viewed from a horizontal plane above the substrate, this occurs when an imprint structure is viewed as partially lying on top of two or more imprint structures but so that the portion of the underlying structures that are not overlapped can still be viewed. The number of imprint structures that is below the top imprint structure may be from 2 to 4 or from 2 to 3. The presence of multiple overlaps may increase the intensity of the interference effect.

The method may be capable of forming imprint structures with a high aspect ratio. The aspect ratio may be taken to be the height to width ratio of the imprint structures. The aspect ratio may be selected from the group consisting of about 5 to about 10, about 5 to about 7, about 5 to about 9, about 7 to about 10, about 9 to about 10 and about 5 to about 7. In one embodiment, the aspect ratio is about 6.

The height of the imprint structure may be in the microscale. The height of the imprint structures may be selected from the group consisting of about 1 micron to about 10 microns, about 1 micron to about 3 microns; about 1 micron to about 5 microns, about 1 micron to about 7 microns, about 1 micron to about 9 microns, about 3 microns to about 10 microns, about 5 microns to about 10 microns, about 7 microns to about 10 microns and about 9 microns to about 10 microns. In one embodiment, the height of the imprint structure may be selected from the range of about 1 micron to about 2 microns or about 1 micron to about 1.5 microns. In another embodiment, the height of the imprint structures may be selected from about 1 micron to about 3 microns.

The width of the imprint structure may be in the nanoscale. The width of the imprint structures may be selected from the group consisting of about 100 nm to about 300 nm, about 100 nm to about 140 nm, about 100 nm to about 180 nm, about 100 nm to about 220 nm, about 100 nm to about 260 nm, about 260 nm to about 300 nm, about 220 nm to about 300 nm, about 180 nm to about 300 nm, about 140 nm to about 300 nm and about 150 nm to about 250 nm. In one embodiment, the width of the imprint structure is about 200 nm. Where the imprint structure is cylindrical in shape, the width of the imprint structure refers to the diameter of the cylindrical-shaped imprint structure.

As mentioned above, the distance between two adjacent imprint structures (or spacing) is smaller than the height of the imprint structure. Hence, it is to be appreciated that a person skilled in the art would be capable of selecting an appropriate value for the spacing without undue experimentation based on the height of the imprint structure and the desired extent of overlap between the imprint structures upon collapse onto the substrate. Typically, the spacing may be selected from the group consisting of about 300 nm to about 900 nm, about 300 nm to about 500 nm, about 300 nm to about 700 nm, about 500 nm to about 900 nm, about 700 nm to about 900 nm and about 450 nm to about 550 nm. In one embodiment, the spacing is about 500 nm. It is to be appreciated that as the imprint structures collapse, the spacing between two adjacent imprint structures may change gradually from the bottom of the imprint structure (ie at the point of contact with the substrate surface) to the other end of the imprint structures. Hence, the spacing between two collapsed imprint structures at the ends may be significantly smaller than the spacing between two imprint structures when measured at the bottom of the imprint structures. This variation in the spacing between different points along the longitudinal axis of the imprint structures may further affect the property of the reflected light when a light is incident on the collapsed imprint structures.

The extent of overlap between an imprint structure on the bottom and an imprint structure on the top depends on the height of the imprint structure and the spacing between two adjacent imprint structures.

The substrate may be a polymer substrate. The polymer substrate may be a thermoplastic polymer. The thermoplastic polymer may comprise one or more monomers selected from the groups consisting of acrylates, phthalamides, acrylonitriles, cellulosics, styrenes, alkyls, alkyls methacrylates, alkenes, halogenated alkenes, amides, imides, aryletherketones, butadienes, ketones, esters, acetals and carbonates.

In one embodiment, the thermoplastic polymer is at least one of a polyethersulfone and a polycarbonate. Exemplary monomers to form the thermoplastic polymer may be selected from the group consisting of methyls, ethylenes, propylenes, methyl methacrylates, methylpentenes, vinylidene, vinylidene chloride, etherimides, ethylenechlorinates, urethanes, ethylene vinyl alcohols, fluoroplastics, carbonates, acrylonitrile-butadiene-styrenes, etheretherketones, ionomers, butylenes, phenylene oxides, sulphones, ethersulphones, phenylene sulphides, elastomers, ethylene terephthalate, naphthalene terephthalate, ethylene naphthalene and combinations thereof.

The choice of thermoplastic polymer for the substrate depends on the surface and mechanical properties of the substrate. These properties of the substrate can aid in obtaining imprint structures with high aspect ratio and result in successful lateral collapse of the imprint structures. The thermoplastic polymer should have a sufficiently low elastic modulus at an elevated temperature for easy filling of the conduits in the mold whilst maintaining the mechanical stability to generate regular patterns of collapsed imprint structures upon application of the lateral force. In addition, thermoplastic polymers with high tensile strength and elongation at break are preferred in order to obtain almost uniform patterns of collapsed imprint structures. Hence, such thermoplastic polymers can be subjected to a high amount of tensile stress on application of the lateral force and can sustain a high stretch-ratio before failure. It should be noted that use of a hard polymer, that is a polymer material that is in a relatively inelastic state, will inhibit the formation of overlapping imprint structures. Conversely, if the substrate is too brittle, the imprints structures are susceptible to breakage from the substrate base (cohesive failures) after the lateral force is applied. The ideal material for the imprinted structures is a relatively strong material that is deformable at elevated temperatures and which has high resistance to fracture under shear and which is subject to the various properties mentioned above.

The tensile strength of the thermoplastic polymer may be selected from the group consisting of about 40 MPa to about 120 MPa, about 40 MPa to about 60 MPa, about 40 MPa to about 80 MPa, about 40 MPa to about 100 MPa, about 60 MPa to about 120 MPa, about 80 MPa to about 120 MPa, about MPa to about 120 MPa, and about 50 MPa to about 60 MPa. In one embodiment, when polycarbonate is used as the thermoplastic polymer, the tensile strength of polycarbonate is about 55 MPa when measured at room temperature (about 25° C.). In another embodiment, when polyethersulfone is used as the thermoplastic polymer, the tensile strength of polyethersulfone is about 80 MPa when measured at room temperature (about 25° C.).

The elongation at break of the thermoplastic polymer may be selected from the group consisting of about 60% to about 170%, about 60% to about 150%, about 60% to about 130%, about 60% to about 110%, about 60% to about 90%, about 90% to about 170%, about 110% to about 170%, about 130% to about 170% and about 150% to about 170%. In one embodiment, when polycarbonate is used as the thermoplastic polymer, the elongation at break of polycarbonate is about 80% to 150%.

When a thermoplastic polymer is used as the substrate, the height and width of the imprint structures can be chosen in order to substantially prevent complete collapse of the imprint structures upon application of the lateral force. The height and width of the imprint structures can be used to calculate the critical elastic modulus E* of the imprint structure. In one embodiment, the imprint structure is cylindrical in shape and hence the E* is calculated based on the height h and diameter d of the cylindrical-shaped imprint structure, as estimated by:

$$E^* = \frac{2^{11/2} 3^{3/4} (1 - \upsilon^2)^{1/4} h^{3/2} W}{(\pi d)^{5/2}}$$

where W is the work of adhesion and ν is the Poisson ratio. If the elastic modulus of the thermoplastic polymer is significantly larger than its critical elastic modulus E* as calculated above, complete collapse of the imprint structures can be substantially prevented such that the imprint structures will lean at an angle upon application of the lateral force. If the elastic modulus of the thermoplastic polymer is significantly lesser than its critical elastic modulus E* as calculated above, the imprint structures tend to collapse completely when the substrate is removed from the mold and do not form an angle with the substrate surface.

A hydrophobic substrate may be used to substantially prevent contact between the collapsed imprint structures and helps to preserve air gaps between the imprint structures. An exemplary hydrophobic substrate is polycarbonate.

The method may comprise the step of selecting a temperature that is the same as or above the glass transition temperature (Tg) of the polymer substrate during the applying step (a). At this temperature, the polymer softens and may conform to the shape of the mold such that imprint structures are created on the surface of the polymer as the polymer is cooled and subsequently hardened. For example, if the mold has conduits, when the polymer substrate is applied to the mold, the softened polymer is able to flow into the conduits of the mold. Hence, imprint structures that project from the polymer substrate are formed in applying step (a).

The temperature used when applying a substrate to a mold is dependent on the type of thermoplastic polymer used. Typically, the temperature may be selected from the group consisting of about 120° C. to about 200° C., about 140° C. to about 200° C., about 160° C. to about 200° C., about 180° C. to about 200° C., about 120° C. to about 140° C., about 120° C. to about 160° C., about 120° C. to about 180° C. and about 150° C. to about 160° C. In one embodiment, where polycarbonate is used as the substrate, the temperature used during applying step (a) is about 155° C.

The pressure used when applying a substrate to a mold is dependent on the type of thermoplastic polymer used. By applying a pressure to the substrate, the softened polymer substrate can be driven into the conduits of the mold under pressure, assisted by the capillary and/or gravitational forces. Typically, the pressure may be selected from the group consisting of about 4 MPa to about 8 MPa, about 4 MPa to about 5 MPa, about 4 MPa to about 6 MPa, about 4 MPa to about 7 MPa, about 5 MPa to about 8 MPa, about 6 MPa to about 8 MPa and about 7 MPa to about 8 MPa. In one embodiment, the pressure is about 6 MPa.

The time period used when applying a substrate to a mold is dependent on the type of thermoplastic polymer used and the complexity of the imprint forming surface. Typically, the time period may be in the range of about 5 minutes to about 45 minutes, about 5 minutes to about 15 minutes, about 5 minutes to about 30 minutes, about 15 minutes to about 45 minutes, about 30 minutes to about 45 minutes and about 10 minutes to about 30 minutes. In one embodiment, the time period is about 30 minutes.

The mold may have a defined surface to create three-dimensional imprint structures during applying step (a). The three-dimensional imprint structures may be dimensioned in at least one of the microscale and the nanoscale.

The mold may have a solid body with an array of conduits extending through the solid body. The mold may be made of any suitable material that is chemically inert and may be harder than the softened substrate when used at the respective temperature. The mold may be made from a material selected from the group consisting of silicon, metal, glass, quartz and ceramic. In one embodiment, the mold may be made of silicon nitride.

The method may comprise, before the applying step (a), the step of treating the mold with an anti-stiction agent. The anti-stiction agent may be a silane-based anti-stiction agent such as a fluorosilane release agent.

The method may comprise, before the applying step (b), the step of partially removing a portion, but not all, of the substrate from the mold. This may enable the substrate to be securely gripped in order to carry out the applying step (b). Further, this may allow the substrate to be detached easily from the mold.

Accordingly, in one embodiment there is provided a method of making a polymer substrate having multi-layered structures thereon, the method comprising the steps of:

a) applying a mold having an imprint forming surface to the polymer substrate while in a thermoplastic state, to form an array of polymer imprint structures that project from said substrate;

b) partially removing the imprint structures from the mold;

c) after step (b), allowing the temperature of the polymer imprint structures to cool and thereby strengthen the polymer imprint structures;

d) applying a lateral force that is substantially normal to said partially removed polymer imprint structures to cause said imprint structures to move angularly towards said polymer substrate;

f) removing said polymer imprint structures from said mold, wherein the array of imprint structures forms a pattern of multi-layered structures thereon.

The method may comprise the use of nanoimprinting lithography. The method may form imprint structures with high patterning yield and may be highly reproducible.

There is also provided a patterned substrate comprising an array of imprint structures disposed on the substrate, each of the imprint structures has a longitudinal axis and wherein each imprint may be disposed at an oblique angle relative to a horizontal plane of the substrate, wherein the array of imprint structures is configured to reflect light incident thereon. The array of imprint structures may form a grating structure on the substrate which serves to diffract or interfere with the incident light such that the reflected light may be of varying wavelengths. Hence, due to the varying wavelengths, different colours and colour intensities may be detected by an optical detector. There is also provided a substrate having multi-layered structures thereon that is made by the process as disclosed herein.

The collapsed imprint structures may create a grating structure on the substrate which may be suitable for reflecting light for detection by an optical detector. Accordingly, the substrate may be used to reflect light in an optical detection system. The optical detection system may be a vapour detection sensor.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

DETAILED DESCRIPTION OF DRAWINGS

Figure 1:
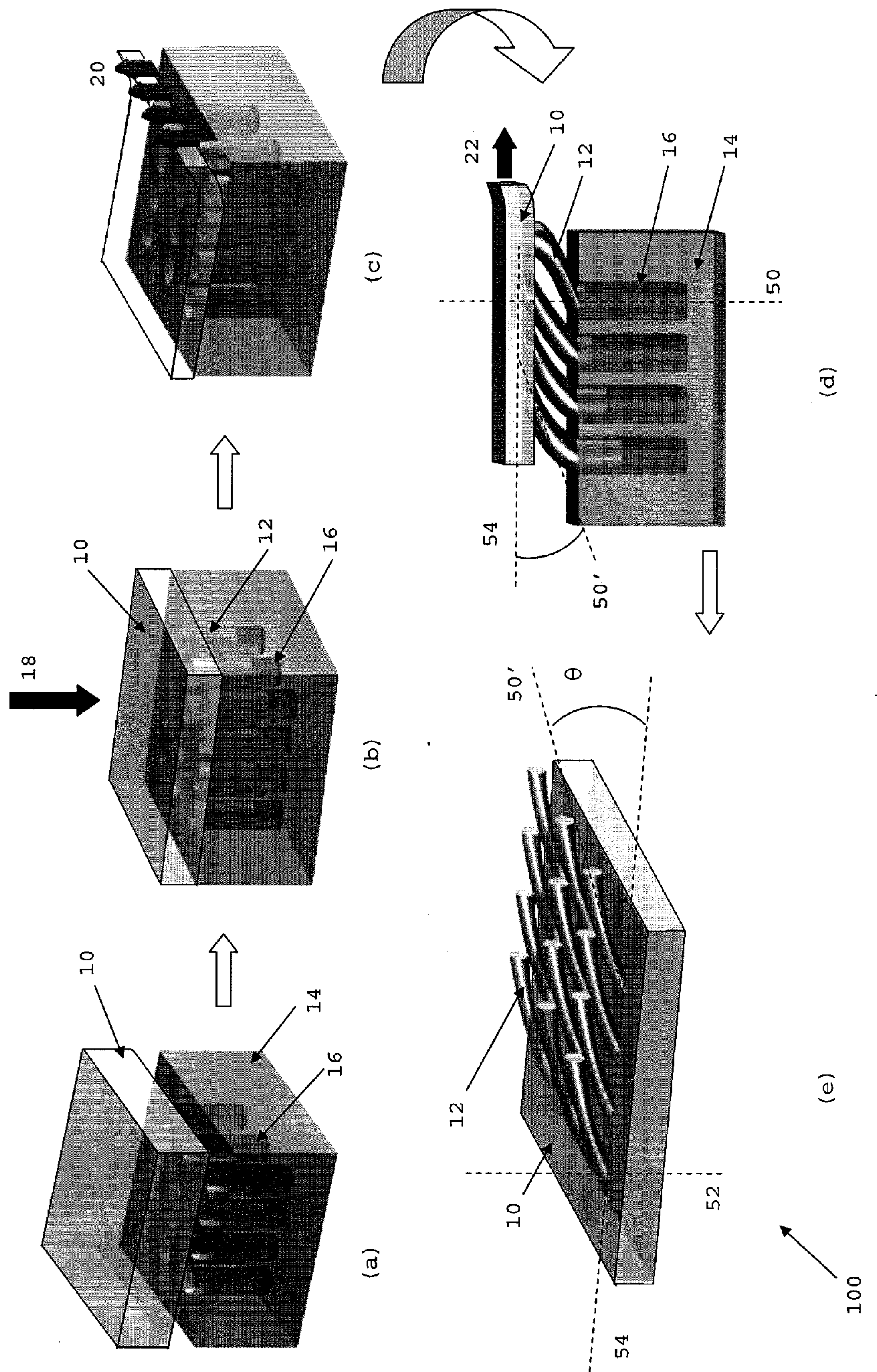
FIG. 1 is a schematic diagram of a method of making a polymer substrate in accordance with an embodiment disclosed herein, in which the polymer substrate has multi-layered structures.

FIG. 1 is a schematic diagram of a method 100 according to a disclosed embodiment for making a polymer substrate 10 having multi-layered structures. The multi-layered structures comprise an array of imprint structures 12 that projects from the substrate 10.

The method 100 comprises the step shown in FIG. 1(*a*) of applying a mold 14 to a surface of a polymer substrate 10. The mold 14 has a patterned surface of a plurality of conduits 16 disposed within the mold 14. In FIG. 1(*b*), the polymer substrate 10 is pressed against the mold 14 using an Obducat nanoimprinter, at a temperature that is the same as or above the $T_g$ of the polymer substrate 10. Under the elevated temperature, the polymer substrate 10 is in a thermoplastic state and the softened material of the polymer substrate 10 is driven into the conduits 16 of the mold 14 by applied pressure 18 and is also assisted by gravity.

In FIG. 1(*c*), the mold 14 and the substrate 10 are cooled down and the polymer substrate 10 within the conduits 16 of the mold 14 partially hardens, but stays deformable, to form the array of imprint structures 12 that projects from the substrate 10. To initiate the detachment of the imprint structures 12 from the conduits 16, a vertical force 20 is applied at the edges of the interface between the polymer substrate 10 and the mold 14. This allows for the partial removal of a portion of the polymer substrate 10 from the mold 14.

In FIG. 1(*d*), a lateral force 22 is applied to the polymer substrate 10. The lateral force 22 is substantially normal relative to a longitudinal axis 50 of said imprint structures 12 (note for illustration, only one longitudinal axis is shown for one of the imprint structure 12). The horizontal translation of the polymer substrate 10 creates a shear force between the array of imprint structures 12 and the mold 14. As a result of the shear force, the array of imprint structures 12 collapses in parallel in that the longitudinal axis 50 is moved angularly towards the substrate 10. The imprint structures 12 partially overlap each other when viewed from a horizontal plane 54 above the substrate and thereby form a pattern of multi-layered structures on the polymer substrate 10 as shown in FIG. 1(*e*). The imprint structures are angularly moved such that the collapsed longitudinal axis 50' of the imprint structures 12 is moved towards the substrate 10 from a substantially vertical axis 52 relative to a horizontal plane 54 of the substrate 10.

The resulting substrate 10 comprises an array of imprint structures 12 disposed on the substrate 10, in which the angularly moved longitudinal axis 50' is at an oblique angle (A) relative to the horizontal plane 54 of the substrate.

Figure 2:
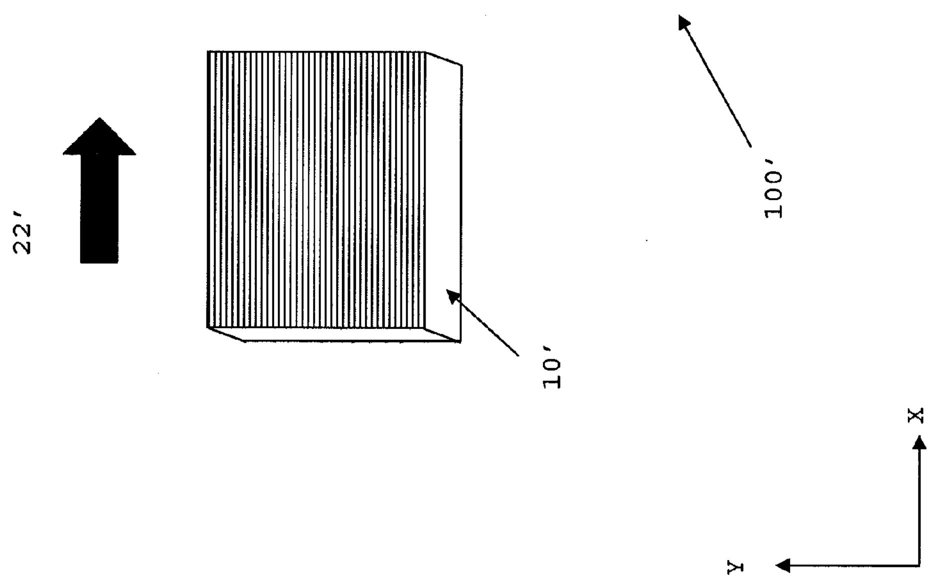
FIG. 2 is a schematic diagram of an additional in an alternative method from that disclosed in FIG. 1.

FIG. 2 is a schematic diagram of the additional step in a method 100' according to another embodiment for making a polymer substrate 10 having multi-layered structures.

The method 100' comprises of the same steps as the method 100 and the same numerals are repeated except that they have the prime symbol ('). In method 100', after the lateral force 22' is applied to the substrate 10' in the x-direction, the mold 14 is turned by 90°. A lateral force 22*a'* is then applied to the substrate 10' in the y-direction, creating a shear force between the array of imprint structures 12 and the mold 14. As a result, the array of imprint structures 12 is pulled in both the x- and y-directions and a pattern of multi-layered structures with periodicity in both the x- and y-directions is formed on the polymer substrate 10'.

EXAMPLES

Mold Preparation

A silicon nitride mold (200-nm circular holes with an aspect ratio of 1:6) was processed by traditional lithography and etching process, which yielded a high definition of structures on the surface of the mold. The mold was cleaned in a piranha solution (a 3:1 mixture of 96% sulfuric acid with 30% hydrogen peroxide) at 120° C. for 30 minutes, rinsed with deionized water, dried in a stream of dry nitrogen, and put in a clean oven at 100° C. for one hour. The mold was then exposed to oxygen plasma for 10 minutes in RIE I Etcher, Sirus (Trion), operated at 200 mTorr oxygen pressure, 10-sccm oxygen flow rate, and a power of 100 W. The mold was further treated with a fluorosilane release agent through an overnight vapor deposition of 1H,1H,2H,2H-perfluorodecyl-trichlorosilane self-assembled monolayer.

Nanoimprint Lithography (NIL) Process

The NIL process was performed using an Obducat nanoimprinter. Two materials were used in the experiments: polycarbonate (PC) and polyethersulfone (PES). PC and PES were obtained from Goodfellow Corporation of Oakdale, Pa. of the United States of America. A PC sheet with a thickness of 1 mm was cut slightly smaller than the mold size, and placed on top of the mold. The mold and PC sheet were heated up to 155° C. and a pressure of 6 MPa was then applied for 30 minutes to let the PC flow slowly into the conduits of the mold. The imprint process was ended by cooling down the temperature to 80° C. and releasing the pressure from the mold. The imprinted PC sheet was subsequently detached from the mold by creating a small crack at one edge of the mold and applying a lateral force in the mold-release step to tip the imprint structures onto one side. The same experimental procedures were carried out to obtain PES imprint structures, except that the mold and PES sheet were heated up to a temperature of 230° C. instead of 155° C.

Characterization

High resolution SEM imaging was carried out with a JEOL Field Emission Scanning Electron Microscope (FESEM) JSM-6700F. A collimated white light beam was used to shine the structure in different angles to the surface normal. The reflection was observed using a stereo-microscope placed at the normal direction to the sample surface and connected to a Charge-Coupled Device (CCD) camera. An Ar+ laser emitting at a wavelength of 532 nm was made incident normal to the sample surface and the angular reflection intensity property was measured using a Si detector across a 180° angle. A slit opening of about 100 μm was put in front of the detector. And the detector moved in a circle with the sample in the center.

Example 1

The method 100 of FIG. 1 was used in this experiment using a polycarbonate (PC) substrate. The PC substrate used in the experiment had a tensile strength of approximately 55 MPA and an elongation at break of 80-1500. These allow the material to be subjected to a high amount of tensile stress on shearing and to sustain a high stretch-ratio before failure.

During the NIL process, the PC substrate 10 was pressed against the silicon nitride mold 14 using an Obducat nanoimprinter. The mold 14 and PC substrate 10 were then heated up to 155° C. Under the elevated temperature, the softened material of the PC substrate 10 was driven into the conduits 16 of the mold 14 by an applied pressure 18 of 6 MPa. The pressure 18 was applied for 30 minutes to let the PC substrate 10 flows slowly into the conduits of the mold.

The NIL process was ended by cooling down the temperature to 80° C. and releasing the pressure 18 from the mold 14. The softened material of the polymer substrate 10 was trapped in the conduits 16 of the mold 14 and formed the array of imprint structures 12 that projected from the substrate 10. The patterned area of the PC substrate 10 is about 2 $mm^2$.

To initiate the detachment of the imprint structures 12 from the conduits 16, a perpendicular force 20 relative to the horizontal plane 54, sufficient to detach the PC substrate 10 from the mold 14, was applied at the edges of the interface between the PC substrate 10 and the mold 14. A lateral force 22 in the range of 10-20 N was then applied to the PC substrate 10. The horizontal translation of the PC substrate 10 created a shear force between the array of imprint structures 12 and the mold 14. As a result of the shear force, the array of imprint structures 12 collapsed in parallel and overlapped each other to form a pattern of multi-layered structures on the PC substrate 10.

The same method 100 of FIG. 1 was carried out again but with a polyethersulfone (PES) substrate instead. During the heating step, the mold 14 and PES substrate 10 were heated up to 155° C. The rest of the steps remained the same. PES has similar mechanical properties to PC that are important in obtaining uniform patterns of sheared nanostructures. Firstly, their high tensile strength allows them to be subjected to high amount of tensile stress on shearing. Secondly, their high elongation-at-break allows them to deform elastically and sustain a high stretch-ration before it breaks.

After the substrates were formed, high resolution SEM imaging was carried out with a JEOL FESEM JSM-6700F. The results are shown in FIGS. 3A to 3C.

Figure 3C:
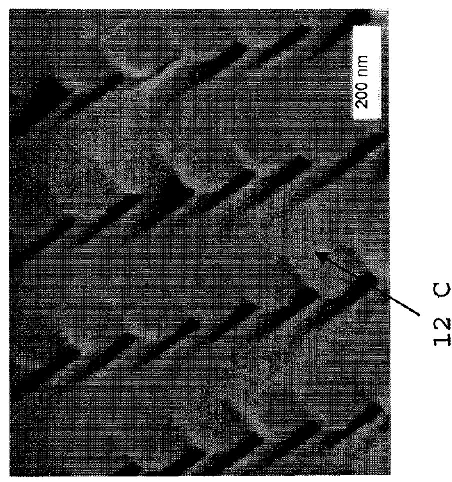
FIG. 3C is a cross sectional view SEM image of the polymer substrate of FIG. 3A.
Figure 3B:
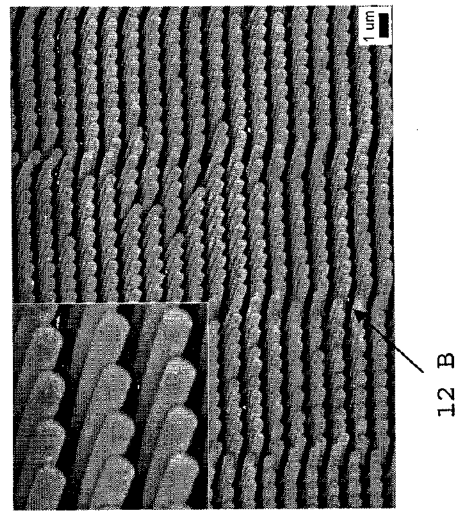
FIGS. 3A and 3B are top view SEM images of polymer substrates manufactured by the method of FIG. 1.
Figure 3A:
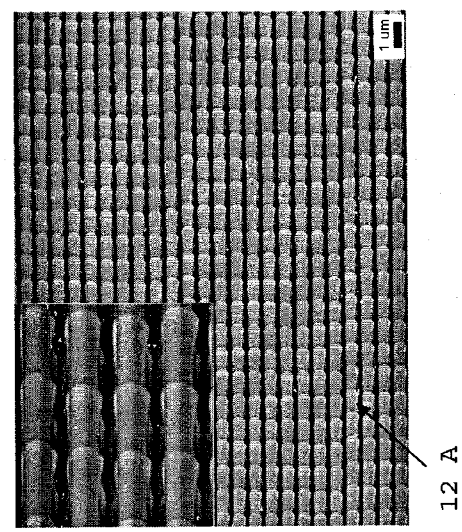

FIGS. 3A and 3C respectively show a top view SEM image and a cross-section view of the PC substrate 10 fabricated in the experiment. FIG. 3B shows a top view SEM image of the PES substrate 10 fabricated in the experiment. The imprint structures 12A-C are approximately 200 nm in diameter, approximately 1.2 μm in length, and leaning at an angle of approximately 45° to the substrate 10. The rows of multilayered nanostructures (imprint structures) 12A-C are separated with a regular spacing of approximately 500 nm. The height and spacing between the nanostructures 12A-C determines the amount of overlap between the neighbouring structures. The inserts in FIG. 3A and FIG. 3B are SEM images at 3× magnification of a section of FIG. 3A and FIG. 3B respectively The PC imprint structures 12A and 12C were in the form of pillars. The critical elastic modulus of the PC pillars formed was calculated to be about 16.7 MPa and its elastic modulus was 2.56 GPa. Since the elastic modulus of PC is significantly larger than its critical value, a complete collapse of the nanostructures can be avoided and the pillars were leaning at an angle on shearing. Referring now to FIG. 3C, it can also be seen from the cross-sectional view that the imprint structures 12C are separated by air spaces with thicknesses of approximately 50 nm.

Example 2

Figure 5:
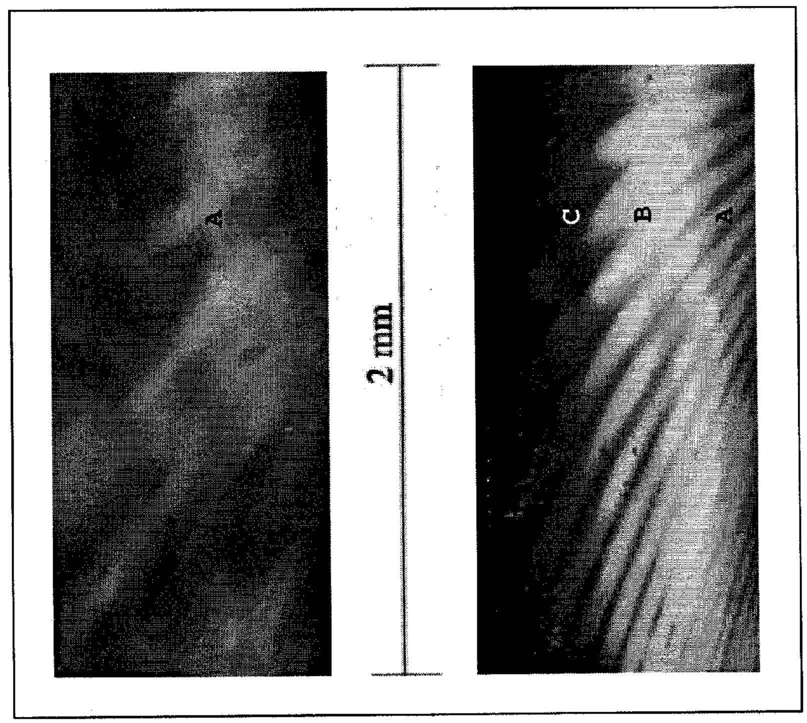
FIG. 5 is a series of optical microscope images obtained by the experimental setup of FIG. 4.
Figure 4:
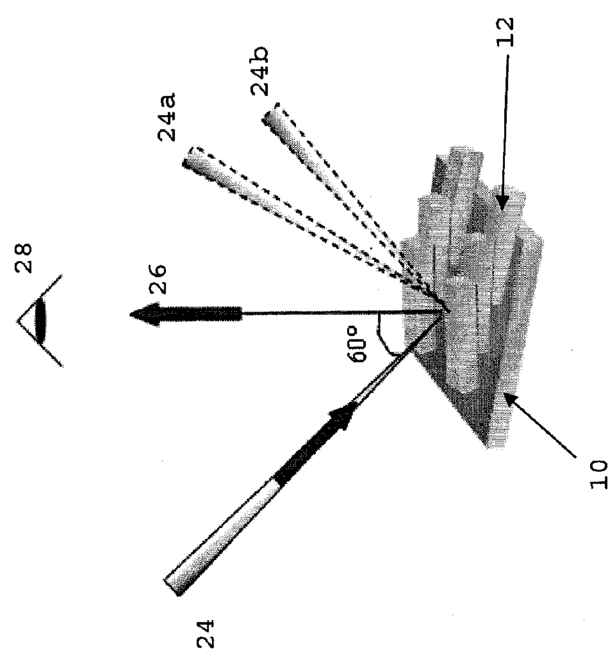
FIG. 4 is a schematic diagram showing an experimental setup to illustrate the reflective optical properties of the polymer substrate manufactured by the method of FIG. 1.

Referring to FIG. 4, there is shown an experimental setup for characterizing the PES substrate formed in Example 1. As shown, a collimate white light beam 24 was used to illuminate the PES nanostructures (imprint structures) 12 on the PES substrate 10 at different angles (24*a* and 24*b*) to the surface normal. The reflection 26 was observed using a stereo-microscope 28 placed at the normal direction to the surface of the substrate 10 and connected to a CCD camera (not shown). A series of optical microscope images were taken through the CCD camera with an objective lens placed on top of the sample and are shown in FIG. 5.

When the incident collimate white light beam 24 was turned 360° around the vertical axis, the colours and colour patterns from the PES substrate 10 change over a broad range. When the collimate white light beam 24 was illuminated to the direction of the imprint structures 12, a uniform blue colour reflection (labeled A) was observed from the PES substrate 10. This image is shown in the top image of FIG. 5. When the directions of the collimate white light beam 24 and the imprint structures 12 were not aligned, a range of colours from blue (labeled A), to yellow (labeled B) and red (labeled C) were observed. This image is shown in the bottom image of FIG. 5.

The variations in colour and colour patterns are related to the arrangement of the nanostructures and are due to the anisotropic nature of the multi-layered structures in one direction. The multi-layered structures have a periodic ridge pattern with multi-layers inside each ridge due to the inclination of the imprint structures 12. The periodic ridge arrangement in one direction makes the structure work like a diffraction grating, while the multi-layers seen from the top due to the inclination of the imprint structures 12 gives the effect of interference and scattering. Both the grating diffraction and the multi-layer reflection contribute to the colour formation.

Example 3

Figure 6:
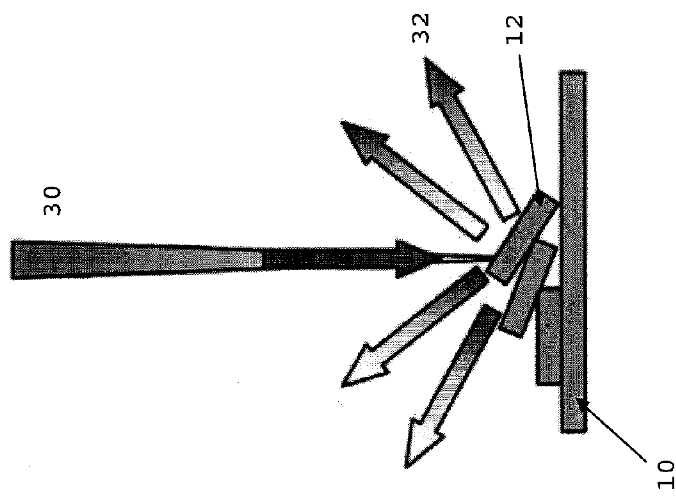
FIG. 6 shows a schematic diagram of a measurement system to obtain a reflectivity spectrum of natural butterfly wings from a butterfly insect and the polymer substrate of FIG. 3A.

Referring to FIG. 6, there is shown a schematic diagram of the experimental procedure for obtaining a reflectivity spectrum of the PC substrate 10 formed in Example 1 having multi-layered structures. As shown, an Ar+ laser 30 emitting at a wavelength of 532 nm was made incident to the PC substrate 10 through a pinhole on a white screen. Arrays of diffraction spots were seen clearly on the screen in the direction perpendicular to the ridge direction (picture not shown), while broad light distribution was observed along the ridge direction. In this example the synthetic wing structures refer to the PC substrate 10 together with the collapsed imprint structures 12 that form the multi-layered structures.

The angular reflection intensity property of the reflected light 32 was measured using a Si detector (not shown) across a 180° angle. A slit opening of about 100 μm was put in front of the detector and the detector moved in a circle with the synthetic wing structures in the center. The same experiment and measurement was carried out with natural butterfly wings and the results of both measurements plotted in the graphs shown in FIG. 7.

Figure 7:
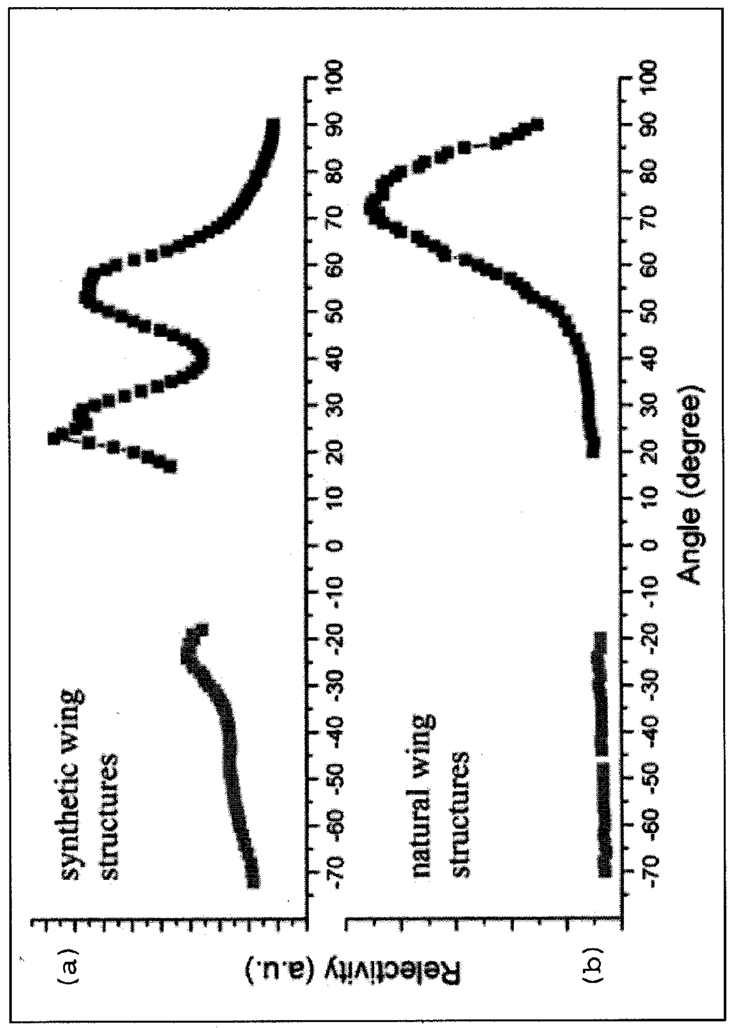
FIG. 7 is a graph showing reflection intensity distribution data over a series of reflected light angles: (a) relates to "synthetic wing structures" or microstructures made in the method disclosed with respect to FIG. 1; and (b) relates to butterfly wing structures.

FIG. 7 shows the reflection intensity distribution versus angle along the ridge direction for both synthetic and natural wing structures. The reflection spreads over an angle of nearly 180°. The center part of the curve is not measured due to the blocking of the incidence laser beam 30 by the detector. The reflectivity of the synthetic wings was higher at one side and has two peak regions, while the other side is relatively weak. The multi-layer reflection is the dominant effect in this broadened reflection. The weak reflection side corresponds to the laser beam 30 facing the collapsed imprint structures 12 inclination direction, while the stronger reflection side corresponds to the laser beam 30 towards the inclination direction. The angle-dependent view in the synthetic structures was similar to that found in natural butterfly wings, where bright and dark zones were observed in the observation hemisphere over the wing surface, as shown in the bottom graph of FIG. 7.

As shown by the two graphs in FIG. 7, the angle-dependent iridescent effect of the synthetic wing structures (7*a*) fabricated according to the methods above was found to be similar to that found in the natural butterfly wings (7*b*).

Applications

Substrates with multi-layered structures thereon can be used in a variety of applications including innovative designs of optical devices, optical gas sensors, and filters for flat-panel displays.

Advantageously, the substrates possess unique optical properties which are more pronounced than those produced by pigments or organic dyes. More advantageously, the generation of colour via the effect of structural colour rather than the use of dyes or pigments, eliminates the problem of photobleaching and other problems associated with the use of dyes and pigments.

Advantageously, the substrates formed mimic the photonic nanostructures found on butterfly wings. These nanostructures on butterfly wings can be used as selective gas or vapour sensors. Hence, the substrates formed can also be used as vapour-detection sensors. Advantageously, optical detection of vapour has a fast response time, and is easily reproducible.

Advantageously, the method disclosed herein for making a substrate having multi-layered structures thereon may be cost effective and may eliminate the need for complicated equipment. Furthermore, the method is easy to carry out and the substrate formed is consistent and reproducible. More advantageously, the method has potential scalability, allowing for commercial-scale manufacture.

Advantageously, the method disclosed herein eliminates the need for chemical treatment of substrate surfaces or multiple depositions of material. Hence, the method may not lead to detrimental changes in the mechanical integrity of the substrate or affect the thermal, optical or chemical properties of the substrate.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. A method of making a substrate having multi-layered structures thereon, the method comprising the steps of:

a) applying a mold having an imprint forming surface to the substrate to form an array of imprint structures that projects from said substrate; and b) applying a lateral force by way of the mold that is substantially normal to said projecting imprint structures to cause said imprint structures to move angularly towards said substrate and thereby form a pattern of multi-layered structures thereon.

2. The method as claimed in claim 1, wherein said applied lateral force is substantially normal relative to a longitudinal axis of said projecting imprint structures.

3. The method as claimed in claim 2, wherein said applying step comprises moving the structures such that the longitudinal axis of said imprint structures is angularly moved towards said substrate from a substantially vertical axis relative to a horizontal plane of said substrate.

4. The method as claimed in claim 3, wherein the moving step results in each of said imprint structures being disposed at an oblique angle relative to a horizontal plane of said substrate, wherein the array of imprint structures is configured to reflect light incident thereon.

5. The method as claimed in claim 1, wherein the applying step comprises moving the substrate in a direction opposite to the direction in which the imprint structures are caused to move angularly.

6. The method as claimed in claim 1, wherein said imprint structures have a height to width ratio selected from the group consisting of 5 to 10, 5 to 7, 5 to 9, 7 to 10, 9 to 10 and 5 to 7.

7. The method as claimed in claim 1, wherein the height of the imprint structures is greater than the distance between two adjacent imprint structures.

8. The method as claimed in claim 1, wherein said imprint structures is dimensioned in at least one of the microscale and the nanoscale.

9. The method as claimed in claim 1, wherein said substrate is a polymer substrate.

10. The method as claimed in claim 9, wherein said polymer substrate is a thermoplastic polymer.

11. The method as claimed in claim 10, wherein said thermoplastic polymer comprises monomers selected from the group consisting of acrylates, phthalamides, acrylonitriles, cellulosics, styrenes, alkyls, alkyls methacrylates, alkenes, halogenated alkenes, amides, imides, aryletherketones, butadienes, ketones, esters, acetals, carbonates and combinations thereof.

12. The method as claimed in claim 9, comprising, during said applying step (a), the step of selecting a temperature that is the same as or above the glass transition temperature (Tg) of said polymer substrate.

13. The method as claimed in claim 1, comprising, during said applying step (a), the step of selecting a pressure from the range of 4 MPa to 8 MPa.

14. The method as claimed in claim 1, comprising the step of providing said mold having a solid body with an array of conduits extending through said solid body.

15. The method as claimed in claim 1, wherein before said applying step (b), the method comprises the step of:

(c) partially removing a portion, but not all, of said substrate from said mold.

16. The method as claimed in claim 1, wherein said multi-layered structures create a grating structure thereon suitable for reflecting light for detection by an optical detector.

17. The method as claimed in claim 1, wherein the imprint structures are thermoplastic polymers and the method further comprises the steps of:

d) before said applying step (b), the step of partially removing the polymer imprint structures from the mold while in a thermoplastic state; and e) after step (d), allowing the temperature of the imprint structures to partially cool and thereby strengthen the polymer imprint structures.

* * * * *